phrey

[19] United States Patent
[11] 3,854,691
[45] Dec. 17, 1974

[54] APPARATUS FOR MOULDING PLASTIC ARTICLES

[75] Inventor: Victor William Stanley Humphrey, Radlett, England

[73] Assignees: GKN Sankey Ltd., Bilston, Staffordshire; ARO Plastics Development Limited, London, both of, England

[22] Filed: Sept. 10, 1973

[21] Appl. No.: 395,582

Related U.S. Application Data

[62] Division of Ser. No. 139,376, May 3, 1971, Pat. No. 3,787,549.

[52] U.S. Cl. .................... 249/91, 425/117, 425/129
[51] Int. Cl. ........................................... B29c 6/02
[58] Field of Search ........... 425/110, 120, 117, 123, 425/129, 249, 468, 441; 249/91, 83; 264/275, 278, 271, 328; 164/332, 334

[56] References Cited
UNITED STATES PATENTS

| 2,356,585 | 8/1944 | Hempel | 425/120 |
| 3,372,448 | 3/1968 | Neys | 249/91 X |
| 3,549,477 | 12/1970 | Burgman | 264/275 X |
| 3,592,887 | 7/1971 | Edwards | 425/129 X |
| 3,709,457 | 1/1973 | Church | 425/129 X |

FOREIGN PATENTS OR APPLICATIONS

| 931,188 | 0/1947 | France | 425/468 |

Primary Examiner—Francis S. Husar
Assistant Examiner—David B. Smith
Attorney, Agent, or Firm—Merrian, Marshall, Shapiro & Klose

[57] ABSTRACT

The specification discloses a method of making an aperture-defining frame member, particularly a window-frame, comprising a rigid frame-shaped reinforcement made of e.g. a solid metal section embedded in synthetic resinous material. The method comprises placing the reinforcement in a mould cavity having the shape of the required frame member and locating the reinforcement in the cavity solely by engaging complementary interfitting formations on the reinforcement and on pin-like projections which extend from the cavity walls, e.g., recesses on the reinforcement engaging the ends of the projections. The longitudinal axes of all the projections are parallel to a predetermined plane and the engagement of the end of each projection with the complementary recess of the reinforcement prevents movement of the latter at least in first directions perpendicular to the plane. The projections are located around the reinforcement to prevent movement of the reinforcement in second directions parallel to the plane. The mould cavity is filled with synthetic resinous material to embed the reinforcement therein while the reinforcement is located in the cavity by the projections, and the cavity is subsequently opened and the projections withdrawn from the completed frame member which is then removed from the cavity.

3 Claims, 10 Drawing Figures

APPARATUS FOR MOULDING PLASTIC ARTICLES

This is a division of application Ser. No. 139,376, filed May 3, 1971, now U.S. Pat. No. 3,787,549.

BACKGROUND OF THE INVENTION

1. Field of the Invention

This invention relates to methods of, and apparatus for, making aperture-defining frame members of the kind comprising a rigid frame-shaped reinforcement embedded in synthetic resinous material.

The invention has been developed in connection with the manufacture of window frames and in particular the type of window frame including an outer frame to be secured to a building and an inner frame pivotally or otherwise movably mounted on the outer frame. In such window frames the outer and inner frames will normally be rectangular. The invention is not limited to the production of such window frames and can be applied to the manufacture of aperture-defining frame members in general. Such frame members may be endless, e.g., rectangular or polygonal, or may be open frame members such as, for example, a door frame which comprises two parallel members with a third member which joins the one ends of the two members while the other ends of the two parallel members are unjoined. The term "aperture-defining frame members" is used herein to include both open and closed frame members.

2. Description of the Prior Art

In making such frame members the synthetic resinous material, i.e., plastics material may be injected into the mould cavity at a pressure in excess of 10,000 p.s.i. so that the pressure in the mould cavity is likely to be at least 5,000 p.s.i. The reinforcement must be held accurately in position in the cavity and must also be held against deflection and distortion.

It has previously been proposed to hold the reinforcement either by four sets of projections lying in two planes, or sets of planes, at right angles or by two sets of projections lying in one plane or a set of parallel planes with metal or plastics chaplets between the reinforcement and the walls of the mould cavity. For example in the former arrangement, considering a reinforcement of square section arranged with its sides vertical and horizontal there may be two sets of projections in vertical planes engaging horizontal surfaces of the reinforcement and two sets of projections in horizontal planes engaging vertical surfaces of the reinforcement. In the latter arrangement there may for example be two sets of projections in vertical planes engaging horizontal surfaces of the reinforcement and the plastics or metal chaplets may be between vertical surfaces of the reinforcement and the sides of the mould cavity.

SUMMARY OF THE INVENTION

It is an object of one aspect of the present invention to provide an improved method of making an aperture-defining frame member.

According to this aspect of the invention we provide a method of making an aperture-defining frame member comprising a rigid frame-shaped reinforcement embedded in synthetic resinous material, the method comprising placing the reinforcement in a mould cavity having the shape of the required frame member, locating the reinforcement in the cavity solely by engaging complementary interfitting formations on the reinforcement and on pin-like projections which extend from the cavity walls so that the longitudinal axes of all the projections are parallel to a predetermined plane and so that the engagement of said formation of each projection with the complementary formation of the reinforcement prevents movement of the latter at least in first directions perpendicular to the plane, preventing movement of the reinforcement in second directions parallel to the plane by suitable location of the projections around the reinforcement, filling the mould cavity with synthetic resinous material to embed the reinforcement therein while the reinforcement is located in the cavity by the projections, subsequently opening the cavity and withdrawing the projections from the completed frame member and then removing the latter from the cavity.

This method has the advantage over the first prior methods referred to above in that at the most two sets of projections are required which wholly locate the reinforcement in the cavity as distinct from the four sets of projections previously required. This arrangement makes tooling much simpler and less expensive.

The method embodying the invention has the advantage over the second of the prior methods referred to above in that it is unnecessary to insert chaplets into the mould cavity to locate the reinforcement thus very much simplifying and speeding up the moulding procedure.

It is preferred that the formation on the reinforcement comprises recess means in which the free ends of the projections engage and the recess means can be grooves with diverging side walls and the projections can have conical free ends closely to engage said side walls.

Movement of the reinforcement in the mould cavity in directions parallel to the plane may be prevented solely by the arrangement of the projections. Thus if one has a closed frame reinforcement it will be apparent that by appropriate location of the projections movement of the reinforcement can be prevented. This is also true if one has an open type reinforcement but it is within the invention to prevent movement in at least some directions parallel to the plane by interengagement of the complementary formations on the reinforcement and the projections, e.g., by providing holes in the reinforcement engaged by the projections.

We have found that the reinforcement may conveniently be a solid metal section having on opposite sides thereof grooves with diverging side walls but it is within the scope of the invention to use tubular reinforcements of metal or in fact rigid reinforcements of any suitable material such as, for example, reinforced plastics material.

It is an object of another aspect of the invention to provide improved apparatus for making an aperture-defining frame member comprising a rigid frame-shaped reinforcement embedded in synthetic resinous material.

According to this aspect of the invention, apparatus for the above purpose comprises mould parts which define a mould cavity having the shape of the required frame member, the mould parts including a fixed inner member, outer members movable towards and away from the inner member and a closing member; a plurality of pin-like projections for locating the reinforcement in the cavity and which extend from the cavity walls so that the longitudinal axes of all the projections are parallel to a predetermined plane, the projections being carried by the inner and outer members and being arranged around the cavity to prevent movement of the reinforcement in the cavity at least in directions parallel to the plane; and means for projecting into and withdrawing from the mould cavity those projections carried by the inner member.

With this arrangement, the projections carried by the outer members may be fixed in position relative thereto although if desired the projections may be movable on the outer members so as to enable all the projections to be withdrawn from the mould cavity before moulding is completed if this is desired.

Brief DESCRIPTION OF THE DRAWING

The invention will now be described in detail by way of example with reference to the manufacture of a window frame comprising inner and outer frame parts each comprising a rigid frame-shaped reinforcement embedded in synthetic resinous material. In the accompanying drawings.

DESCRIPTION OF THE PREFERRED EMBODIMENTS

Figure 3:
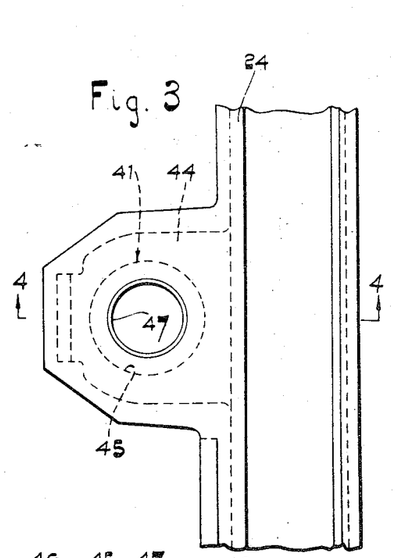
FIG. 3 is a side elevation of a hinge detail applicable to the frames of FIGS. 1 and 2.
Figure 4:
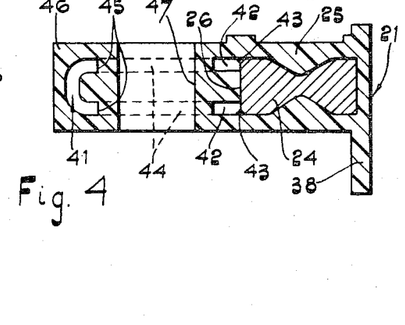
FIG. 4 is a section on the line 4—4 of FIG. 3.
Figure 5:
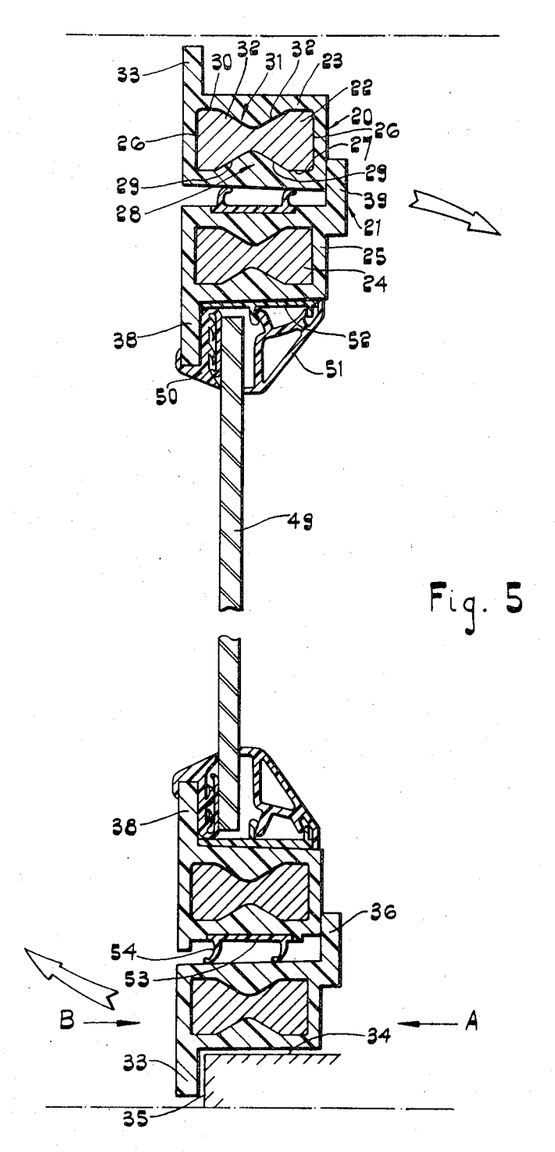
FIG. 5 is a vertical section through a complete window embodying the outer and inner frames of FIGS. 1 and 2.

Referring now to FIGS. 1 to 5, the window frames thereshown comprises an outer frame 20 and an inner frame 21, each frame being generally rectangular and comprising a rectangular metal reinforcement embedded in a covering of synthetic resinous, i.e., plastics material. In FIG. 5 the reinforcement for the outer frame 20 is indicated at 22 and the covering at 23. The reinforcement for the inner frame 21 is indicated at 24 and the covering at 25. Each reinforcement 22 and 24 is in the form of a rectangular frame formed of solid metal sections which are mitred at their ends and are welded together. The shape of the section is similar for each frame and comprises, referring to the reinforcement 22, parallel straight sides 26, and an inner side 27 having a groove 28 therein with diverging side walls 29 and an outer side 30 having a groove 31 therein with diverging side walls 32. The material of the reinforcement frame is preferably mild steel and the frame members can be cut off from a solid drawn section, their ends mitred and welded together.

The coverings 23 and 25 are formed with flanges as required.

Figure 1:
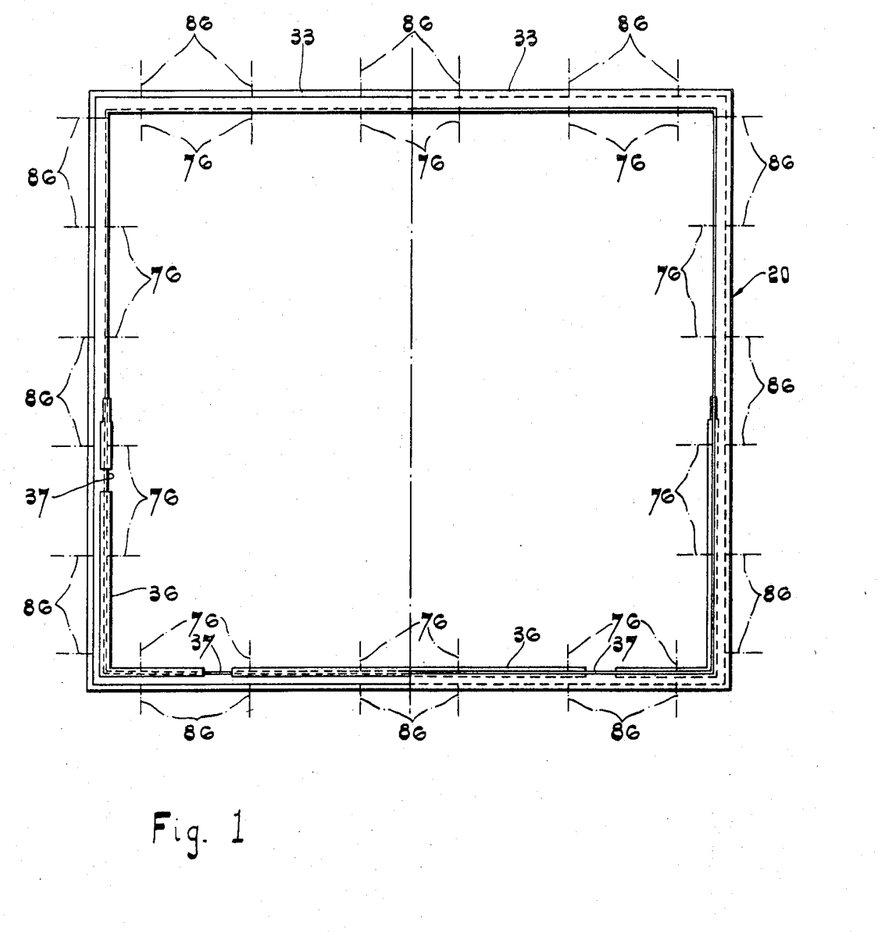
FIG. 1 is an elevation of an outer window frame member, the left hand part of FIG. 1 being an elevation in the direction of the arrow A in FIG. 5 and the right hand part of FIG. 1 being an elevation in the direction of the arrow B in FIG. 5

Thus referring to FIGS. 1 and 5, the outer frame 20 is provided with a continuous, outwardly directed, peripheral flange 33 which is arranged to overlap the edge of an aperture 34 in a supporting wall 35. The lower half of the frame is provided with an inner flange 36 which is inwardly directed as is clear from FIGS. 1 and 5 and which has discontinuities 37 to receive stays or fastener for the window and which are not shown.

Figure 2:
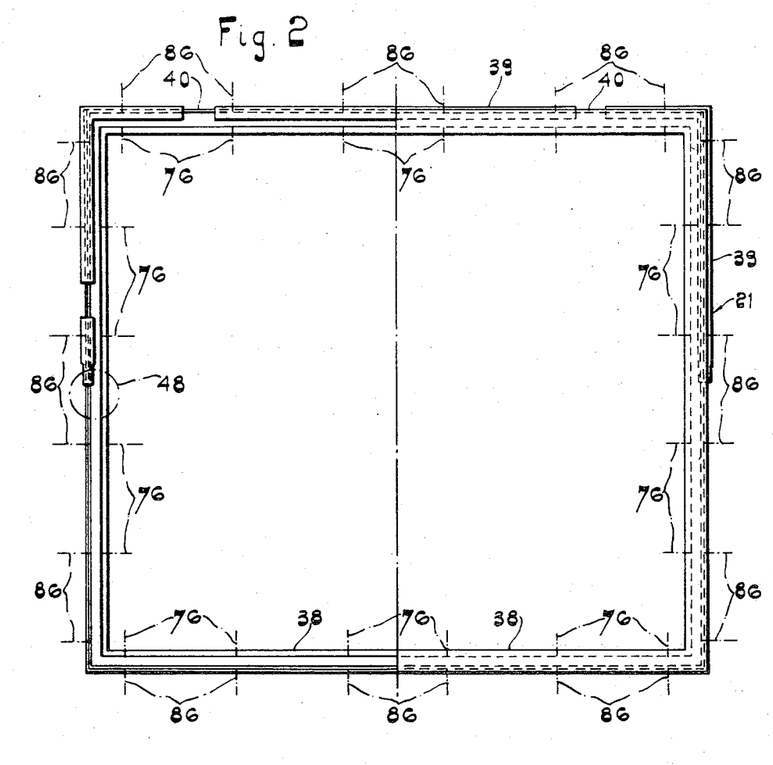
FIG. 2 is an elevation similar to FIG. 1 showing the inner frame of the window, the left hand part of FIG. 2 being an elevation in the direction of the Arrow A in FIG. 5 and the right hand part of FIG. 2 being an elevation in the direction of arrow B in FIG. 5.

The inner frame 21, referring to FIGS. 2 and 5, has a continuous, inwardly directed flange 38 on its outer surface as shown in FIG. 5 and over the upper part of a frame it has on its inner surface an inwardly directed flange 39 provided with discontinuities 40 for window stays and fasteners, not shown.

FIGS. 3 and 4 show a detail of a hinge means which are provided on the frames 20 and 21 whereby the frames may be hinged together. FIGS. 3 and 4 actually show part of the inner frame 21 and referring to these figures, a U-shaped metal strap 41 has its free ends 42 welded at 43 to one side 26 of the reinforcement 24 so that the limbs 44 of the strap are generally perpendicular to the side 26. The limbs 44 are provided with aligned apertures 45 and the strap is embedded in a part 46 of the covering 25. Received in the apertures 45 is a metal bushing 47 which is held in position by the plastics material of the part 45. The location of the hinge arrangement is indicated by the circle 48 in FIG. 2 and a similar hinge arrangement is provided on the outer frame 20 so that pivot pins may be passed through the aligned bushes such as 47 in the hinge parts thus to hinge the frame members together. In FIG. 5, the frame members are hinged about a horizontal axis. The part 46 of the covering is produced simultaneously with the main part of the covering 25 as will be described below.

Referring to FIG. 5, the window is completed by a pane of glass 49 received in the inner frame 21 and held therein by a peripheral seal 50, peripheral beading 51 and a peripheral extrusion 52 secured to the inner frame and which locate the seal 50 and the beading 51. The outer periphery of the inner frame 20 also carries, in a groove 53 a seal 54 to seal with the inner periphery of the outer frame.

The manufacture of the frames will now be described in relation to FIGS. 6 to 9.

Figure 6:
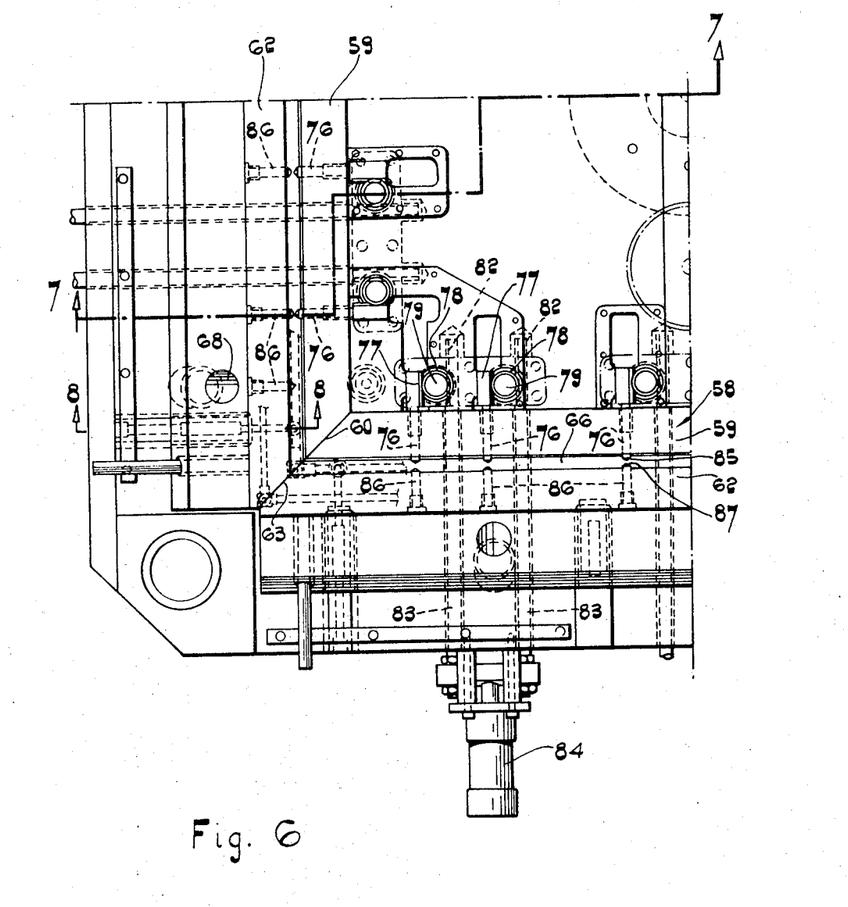
FIG. 6 is a partial plan view of apparatus embodying the invention for producing a frame member embodying the invention.
Figures 7, 8:
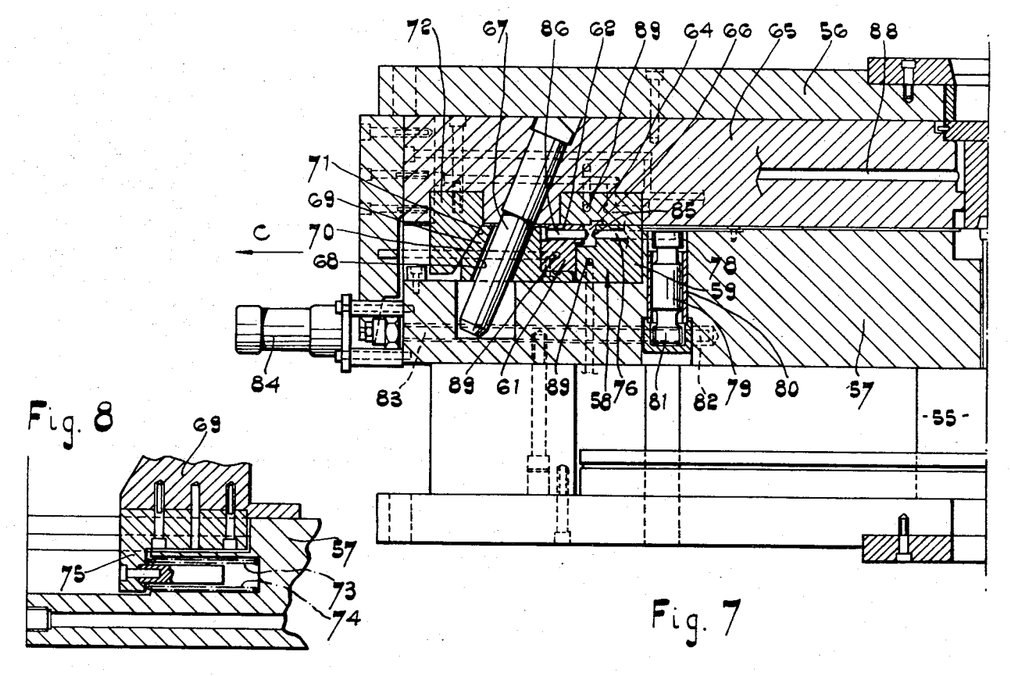
FIG. 7 is a section on the line 7—7 of FIG. 6.
FIG. 8 is a detailed section on the line 8—8 of FIG. 6.
Figure 9:
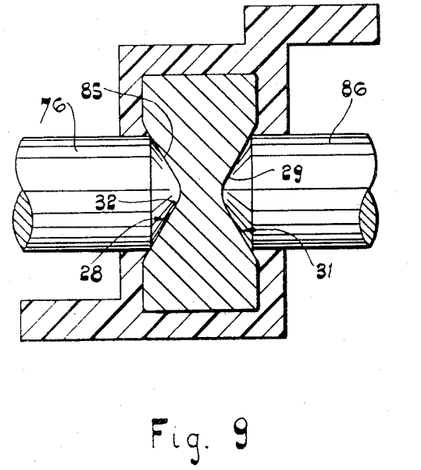
FIG. 9 is a detailed section showing how the reinforcement is held in the mould cavity by the projections.

Referring first to FIGS. 6 and 7 the apparatus there shown comprises a lower platen 55 and an upper platen 56. The lower platen 55 carries a base member 57 which in turn carries an inner, mould-cavity-forming member 58. The member 58 is rectangular and is made up of four elements, two of which are shown at 59 in FIG. 6, the elements meeting at a mitred corner 60.

The mould cavity is further defined by an outer mould-cavity-forming assembly 61 which comprises four members two of which are indicated at 62 in FIG. 6 and which are independently movable towards and away from the elements 59. When the elements 62 are in their inner positions they are as shown in FIGS. 6 and 7 and meet at a mitred corner 63.

The mould cavity is completed by a closing member 64 which is carried by the upper platen 56 through an upper support 65. The inner member 58, the outer assembly 61 and the closing member 64 together define, when the mould is closed, a mould cavity indicated at 66. This mould cavity is in the present case in the form of an endless channel of rectangular shape in plan view but it will be appreciated that the shape of the cavity would depend on the shape of the frame member to be made.

The upper support 65 carries a number of pins, one of which is indicated at 67 which are inclined to the vertical and each of which is received in a bore 68 in an outer support 69 to which a member 62 is secured. When the upper platen 56 is moved upwardly in FIG. 7 the engagement of the pins 67 in their bores 68 results in the outer support 69 moving outwardly as in the direction of the arrow C in FIG. 7 and thus moving outwardly the members 62 of the assembly 61. As will be described this opens the mould cavity and allows the frame member to be removed and the closing member 64 is also moved upwardly with the upward movement of the upper platen 56. Each outer support has an inclined surface 70 which engages when the mould is closed with an inclined surface 71 on a wedging member 72 carried by the upper support 65 so that when the mould is closed the outer supports 69 are held against outward movement by engagement of the inclined surfaces.

To facilitate outward movement of the outer supports with their members 62 a spring arrangement is provided as shown in FIG. 8. Thus a plurality of springs, one of which is shown at 73 are located in bores such as 74 in the base member 57. Each spring 73 acts on a flange 75 of the outer support 69 tending to force the latter outwardly.

The reinforcement such as 22 or 24 is held in the mould cavity 66 by pin like projections mounted on the inner elements 59 and the outer members 62. Referring first to the inner members 59, the projections are indicated in FIGS. 6 and 7 at 76. Each projection is formed at its inner end with a toothed rack 77 which engages with a pinion 78. The pinion 78 is formed at the upper end of a shaft 79 shown in FIG. 7 mounted in a bearing sleeve 80 in the base member 57. The lower end of the shaft 79 is formed with a pinion 81 which is engaged by a toothed rack 82 formed at the end of a rod 83 operated by a pneumatic or hydraulic jack 84. As will be seen from FIG. 6, there are two rods 83 associated with each jack 84 and operated thereby, these two rods operating two shafts 79 to operate two adjacent projections 76. All the projections 76 are operated in a similar manner as will be apparent from FIGS. 6 and 7, the free end of each projection being indicated at 85.

The outer members 62 also carry projections indicated at 86 and having conical ends 87. It will be seen from FIGS. 6 and 7 that each projection 86 is directly opposite to a projection 76 and the projections 76 and 86 extend in opposite directions from the walls of the mould cavity. Thus the projections are arranged in pairs, each pair comprising a projection 76 and a projection 86 and the projections 76 belong to one set and the projections 86 to another set.

The mould assembly is provided with conventional means for introducing synthetic resinous material into the cavity, such means being indicated generally at 88 and cooling water passages 89 are provided in the various mould parts.

The manufacture of a frame member will now be described in general terms. A reinforcement such as 22 or 24 is first manufactured by cutting to the desired length a solid drawn section of the shape referred to above and mitring and welding the ends of the length to form a reinforcing frame. The mould shown in FIGS. 6, 7 and 8 is opened by raising the upper platen 56 which raises the closing member 64 and moves outwardly the outer members 61 by engagement of the pins 67 in the bores 68 and the action of the springs 74 as described above. The projections 76 are retracted wholly into the elements 59 by operation of the pneumatic or hydraulic jacks 84 acting through the rods 83, the rack and pinions 82 and 81, the shafts 79, the pinions 78 and the racks 77. The reinforcing frame is then placed in the cavity and the pneumatic jacks 84 are operated to project the projections 76 into the cavity so that the conical ends 85 thereof engage in the groove 28 in the inner wall of the reinforcement and the conical end closely engages the diverging side wall 29. The mould is then closed by lowering the upper platen 56 which has the effect of moving inwardly the outer members 62 via the pins 67 and the bores 68 and against the action of the springs 74 and clamping said outer members in their inner positions through engagement of the inclined surfaces 70 and 71. Simultaneously, the closing member 64 of the cavity comes into engagement with the inner and outer members thus to close the cavity. As the outer members 62 move inwardly the projections 86 engage the reinforcement and the conical ends 87 of the projections engage in the groove 31 in the outer walls of reinforcement, the conical surfaces at the ends of the projections closely engaging the diverging walls 32 of the groove 31.

The reinforcement is thus located against movement in vertical directions in FIG. 7 by engagement of the conical ends 85 and 87 of the projections 76 and 86 in the grooves 28 and 31. The reinforcement is located against movement horizontally in FIG. 7 by the arrangement of the projections around the reinforcement and in FIGS. 1 and 2 the centre lines of the projections are indicated to illustrate how the reinforcement is held against horizontal movement.

Plastics material is now forced into the die cavity and completely embeds the reinforcement. It also embeds the hinge strap 41 referred to above. When the moulding is completed and the plastic material is solid, the pneumatic jacks 84 are operated to retract the projections 76 and the cavity is opened by raising the upper platen 56 which moves the outer members 62 outwardly and thus disengages the projections 86 from the frame member and the latter can then be removed from the die cavity and a further moulding operation carried out with a fresh reinforcement.

The essential feature of the present invention is the location of the reinforcement in the mould cavity. In this respect reference is made to FIG. 9 which shows on a larger scale the engagement of the conical end portions 85 and 86 of the projections 76 and 86 with the diverging walls 32 and 29 of the grooves 31 and 28 respectively. It will be seen that the conical end portions closely engage the diverging walls thus positively preventing movement of the reinforcing core in vertical directions in FIG. 9. It is to be noted that the longitudinal axes of all the projections 76 and 86 are parallel to a horizontal plane in FIG. 7. By having all the projections with their longitudinal axes parallel to a plane and having interfitting formations which engage with interfitting formations on the reinforcement, i.e., the conical ends 85 and 86 in the grooves 31 and 29 it is possible wholly to locate the reinforcement in the die cavity merely by the two sets of projections 76 and 86. It will be appreciated that by arranging the projections 76 and 86 as shown by their centre lines in FIGS. 1 and 2 movement of the reinforcement in horizontal planes in FIG. 7 is prevented and the interfitting formations prevents movement of the reinforcement in vertical planes in that figure. This arrangement very much simplifies moulding since it is unnecessary to provide four sets of projections, for example projections to engage the vertical sides of the reinforcements and further projections to engage the horizontal sides thereby to locate the reinforcement wholly within the mould cavity.

As thus far described, movement of the reinforcement in the mould cavity in horizontal planes in FIG. 7 is prevented wholly by suitable arrangement of the projections 76 and 86 around the reinforcement. Such movement would be prevented by having a single set of projections 76 or 86 but while this may be possible in some cases our experience suggests that to avoid distortion of the reinforcement during moulding it is necessary to hold the reinforcement between two sets of projections so as not only to locate the reinforcement against movement in horizontal planes in FIG. 7 but also to prevent local distortion of the reinforcement during the moulding operation.

Figure 10:
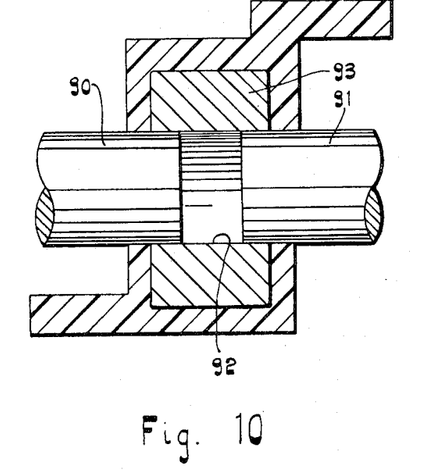
FIG. 10 is a detailed section similar to FIG. 9 showing an alternative arrangement for holding the reinforcement in the mould cavity.

An alternative arrangement is shown in FIG. 10 in which there are shown two protections 90 and 91 which engage in a bore 92 in a reinforcement 93. In this arrangement, it will be appreciated that since the projections 90 and 91 are a reasonably close fit in the bore 92 the engagement of the projections in the bore will serve to prevent movement not only in vertical directions in FIG. 10, i.e., in directions perpendicular to the plane containing the longitudinal axes of the projections but will also prevent movement in some horizontal directions, i.e., in horizontal directions perpendicular to the plane of FIG. 10. Movement of the reinforcement in horizontal directions parallel to the plane of FIG. 10 would be prevented by a suitable arrangement of the projections. The arrangement of FIG. 10 is not preferred because of the practical disadvantage of having very accurately to provide the bores 92 in the reinforcement so that these bores align with the projections 90 and 91 when the reinforcement is in the mould. It is preferred to use the groove arrangement of FIG. 9 since the conical ends of the projections can engage anywhere in the grooves 28 and 31 and it is not necessary to provide accurately located bores in the reinforcement.

Various modifications may be made to the method and apparatus previously described. The method has been described as including the step of leaving the projections 76 and 86 in engagement with the reinforcement until the moulding has been completed so that when the frame member is withdrawn from the mould cavity bores are left in the covering of plastics material. These bores may be filled with plugs and bushes as described in our co-pending application no.

If desired, however, the projections may be withdrawn during the moulding step so that the voids left by the projections are filled by the plastics material. In such a method, the reinforcement would be held by the projections until the mould cavity was substantially full and the reinforcement therefore located by the plastics material and then the projections would be withdrawn so that the voids would be filled. In such an arrangement it would be necessary to have means on the outer mould parts for withdrawing the projections 86 and such means would be similar to the means provided on the inner mould part.

In a further modification of the method, instead of using a reinforcement which is solid it may be tubular and if desired the tube may be filled with some relatively cheap material to prevent the tube collapsing during injection of the plastics material.

It will be seen that the invention provides an improved method of, and apparatus for, manufacturing aperture-defining frame members. The invention has been described in particular in relation to the manufacture of closed frame members and in particular to the manufacture of window frames. However, the invention can be applied to the manufacture of open, aperture defining frame members as described at the beginning of the specification.

I claim:

1. Apparatus for making an aperture-defining frame member comprising a rigid frame-shaped reinforcement embedded in synthetic resinous material; the apparatus comprising mould parts which define a mould cavity having the shape of the required frame member, the mould parts including a fixed inner member, outer members movable towards and away from the inner member in first directions parallel to a fixed plane and a closing member movable towards and away from inner and outer members in second directions perpendicular to said plane, a plurality of pin like projections for locating the reinforcement in the cavity, means for mounting respective pairs of said projections on said inner and outer members around said cavity to prevent movement of the reinforcement in the cavity at least in directions parallel to said plane and so that the longitudinal axis of each projection is parallel to said plane and to one of said first directions; and positively operable means for projecting into and withdrawing from the mould cavity those respective projections mounted on the inner member.

2. Apparatus according to claim 1 wherein the longitudinal axes of all the projections lie in said plane.

3. Apparatus according to claim 1 wherein the respective projections mounted on the outer members are fixed in position relative thereto so as to be withdrawn from the frame member as the outer members are moved away from the inner member.

* * * * *